(12) United States Patent
Schroedter (10) Patent No.: US 8,757,451 B2
(45) Date of Patent: *Jun. 24, 2014

(54) POWDER MEASURING AND DISPENSING APPARATUS

(71) Applicant: Easy Go Dispenser, LLC, Chicago, IL (US)

(72) Inventor: Blake Schroedter, Chicago, IL (US)

(73) Assignee: Easy Go Dispenser, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/866,109

(22) Filed: Apr. 19, 2013

(65) Prior Publication Data

US 2013/0233446 A1 Sep. 12, 2013

Related U.S. Application Data

(63) Continuation of application No. 13/091,818, filed on Apr. 21, 2011, now Pat. No. 8,439,231.

(51) Int. Cl.
*G01F 11/00* (2006.01)
*G01F 11/24* (2006.01)
*B65B 1/36* (2006.01)

(52) U.S. Cl.
CPC .. *B65B 1/36* (2013.01); *G01F 11/24* (2013.01)
USPC ........................ 222/368; 222/363; 222/153.13

(58) Field of Classification Search
USPC ........... 222/129.2, 129.3, 133, 134, 631, 636, 222/153.01, 153.04, 153.09, 153.13, 424.5, 222/368, 360, 355, 363, 359, 306; 141/383
See application file for complete search history.

(56) References Cited

U.S. PATENT DOCUMENTS

| 1,514,834 | A | * | 11/1924 | Danenhower | 222/288 |
| 2,339,908 | A | * | 1/1944 | Brewer et al. | 222/368 |
| 2,779,502 | A | * | 1/1957 | Ackerman, Jr. | 222/48 |
| 4,079,867 | A | * | 3/1978 | Tannehill | 222/368 |
| 4,151,933 | A | * | 5/1979 | Myers | 222/288 |
| 4,266,695 | A | * | 5/1981 | Ruperez | 222/185.1 |

(Continued)

OTHER PUBLICATIONS

Schroedter; "Powder Measuring and Dispensing Apparatus"; U.S. Appl. No. 13/091,818, filed Apr. 21, 2011.

*Primary Examiner* — Frederick C Nicolas
*Assistant Examiner* — Bob Zadeh
(74) *Attorney, Agent, or Firm* — Keating & Bennett, LLP (57) ABSTRACT

A powder dispensing apparatus for storing and dispensing a measured predetermined amount of powder substance having a bottom housing chamber, a middle chamber, a removable, rotatable measuring device, a tapered top chamber, and a cap. The top end of the bottom housing chamber is engageable with the bottom end of the middle chamber, the top end of the middle chamber is engageable with the bottom end of the tapered top chamber, and the top end of the tapered top chamber is engageable with the cap or a liquid receptacle. The measuring device is slidably engageable with the internal chamber of the middle chamber and has an open cavity for measuring and dispensing a powder substance. The open cavity receives a measured predetermined amount of powder substance from the bottom housing chamber and upon rotation of the measuring device; the powder substance is dispensed from the open cavity through the tapered top chamber to a liquid receptacle. The measuring device has a locking tooth and spring mechanism which engages with the locking ring of the middle chamber.

18 Claims, 5 Drawing Sheets

(56) References Cited

U.S. PATENT DOCUMENTS

| | | | |
|---|---|---|---|
| 4,569,463 A * | 2/1986 | Pellegrino | 222/288 |
| 5,123,572 A * | 6/1992 | Ford | 222/135 |
| 5,222,635 A * | 6/1993 | Chamo | 222/306 |
| 5,292,037 A * | 3/1994 | Held | 222/339 |
| 5,685,461 A * | 11/1997 | Mitchell | 222/184 |
| 5,758,803 A * | 6/1998 | Liao et al. | 222/440 |
| 6,036,060 A * | 3/2000 | Munsch et al. | 222/368 |
| 6,293,440 B1 * | 9/2001 | Weaver | 222/368 |
| 6,766,924 B1 * | 7/2004 | Ophardt et al. | 222/368 |
| 8,439,231 B2 * | 5/2013 | Schroedter | 222/153.13 |

\* cited by examiner

POWDER MEASURING AND DISPENSING APPARATUS

BACKGROUND OF THE INVENTION

1. Field of the Invention

The present invention relates to an apparatus for dispensing a pre-measured amount of a powder substance into another receptacle.

2. Description of the Prior Art

Powder dispensing devices are well known. They are used to mix pre-measured amounts of a powder substance such as baby formula or powdered drink mix. These powder substances are hard to measure and mix while on the go. The powder dispensing devices of the prior art generally use a housing chamber to store a powder substance and a dispensing chamber to dispense a powder substance into a receptacle.

U.S. Pat. No. 5,588,563 discloses a quantitative dispensing device having a cylindrical body. A separator plate is engaged in an inner annular slot on the top of the cylindrical body, forming a bottom housing chamber and a top measuring chamber. The separator plate has an opening which allows the powder substance to flow from the bottom housing chamber to the top measuring chamber. The top measuring chamber includes a scale divider having a sleeve and wing part for measuring varying amounts of a powder substance. Patent '563 does not disclose three separate chambers, interchangeable measuring devices, nor a locking tooth, locking ring, and spring mechanism for alternate retention in and removal from the measuring device from the housing.

U.S. Pat. No. 5,947,336 discloses a power dispensing device having a cylindrical container with a removable top for covering a central storage area holding a dry food commodity. The mid-section of the container includes a tapered funnel terminating in an opening, which includes screw threads for engaging the opening with a bottle. A rotatable cylinder is operably carried on the funnel having two pre-measured cavities for collecting an amount of the dry food product. Upon rotation of the cylinder, the cavity carries the product and dispenses the dry food into another receptacle. The device also contains a latch and flange mechanism for locking the rotatable cylinder in a fixed position. Patent '336 does not disclose three separate chambers, interchangeable measuring devices, nor a locking tooth, locking ring, and spring mechanism for alternate retention in and for removal from the measuring device from the housing.

U.S. Pat. No. 6,962,274 discloses a device for measuring, dispensing, and storing of powder, granular, and grain materials. The device includes a storing container and a measuring and dispensing unit. The measuring and dispensing unit of the device includes a moveable slide which delivers the substance from the receiving opening, in the storage container, to the dispensing opening. The slide includes a spring mechanism to return the slide into its original position after operation and a retaining apparatus to hold the slide inside the device in its dispensing position when the device is not in use. Patent '274 does not disclose three separate chambers, interchangeable measuring devices, nor a locking tooth, locking ring, spring mechanism for removal of the measuring device, and a tapered top chamber engageable with a liquid receptacle.

U.S. patent publication 2010/0012683 discloses a powder dispensing device having a hollow housing member and two cover members. The first cover member includes an aperture for allowing a powder substance to pass through from the housing member to a slidable measuring member with an open cavity to measure the powder substance. The second cover member fits over the first cover member and includes an aperture in its side wall to dispense the powder substance. Patent publication '683 does not disclose interchangeable measuring devices, nor a locking tooth, locking ring, and spring mechanism for retention and removal of the measuring device from the housing, nor a tapered top chamber engageable with a liquid receptacle.

The prior art to date does not disclose a powder dispensing device combining three separate chambers, interchangeable measuring devices, a locking tooth, locking ring, and spring mechanism for retention and removal of the measuring device from the housing, and a tapered top chamber engageable with a liquid receptacle. None of the prior art can be combined in this way to suggest these necessary modifications. There is no teaching, suggestion, or motivation that would have enabled a person of ordinary skill in the art to modify any prior art powder dispensing device to allow interchangeable measuring devices and a locking tooth, locking ring, and spring mechanism for retention and removal of the measuring device.

It is a primary object of the present invention to provide an apparatus for storing, measuring and dispensing a predetermined amount of powder substance into a liquid or other receptacle.

Another object of the present invention is to provide users with an easy way to dispense and mix food and drinks while on the go.

Still another object of the present invention is to provide users with an easy way to disassemble and clean components comprising the powder dispensing apparatus.

SUMMARY OF THE INVENTION

The powder dispenser of the present invention comprises three separate chambers and a measuring device. The bottom housing chamber receives and stores a powder substance. The middle chamber is removably fastened to the bottom housing chamber. The measuring device is removably, rotatably, and slidably engageable with the middle chamber and has an open cavity to receive and measure a predetermined amount of powder substance from the bottom housing chamber. The tapered top chamber is removably fastened to the middle chamber and receives and dispenses the measured amount of powder substance from the cavity of the measuring device.

The measuring device includes a locking tooth which is rotatable from a first position which locks the measuring device into a locking ring of the middle chamber, to a second position which unlocks the measuring device from the locking ring of the middle chamber allowing removal of the measuring device from the middle chamber. In one embodiment of the present invention, the middle chamber and the measuring device each include engageable protuberances to halt rotation of the measuring device when a first protuberance meets a second protuberance, which may be the locking tooth.

The shape of the mouth of the tapered top chamber can be variable. In one embodiment of the present invention, the mouth can be cone-shaped and engageable with the mouth of a liquid receptacle. In another embodiment of the present invention, the mouth of the tapered top chamber can include a removable lid to cover the mouth of the tapered top chamber when the powder dispenser is not in use.

BRIEF DESCRIPTION OF THE DRAWINGS

The present invention is further described with reference to the accompanying drawings in which.

DETAILED DESCRIPTION OF THE ILLUSTRATED EMBODIMENTS

Referring to FIGS. 1-6, the powder dispensing apparatus 10 comprises a hollow housing chamber 12, a middle chamber 18, a measuring device 24, and a tapered top chamber 26. Housing chamber 12, which stores the powder substance 44 (FIG. 5), has an open top end 14 and a closed bottom end 16. Middle chamber 18 has a partially open top end 20, a partially open bottom end 22, an internal chamber 58 (FIG. 6), a locking ring 42, and a protuberance 54 (FIG. 7). Top chamber 26 has an open top end 28 and an open bottom end 30. The open top end 28 of the top chamber 26 may be covered by a cap 32 when the powder dispensing apparatus 10 is not in use.

The open top end 14 of the housing chamber 12 has threads 46 which are engageable with the threads 48 on the bottom end 22 of the middle chamber 18. The top end 20 of the middle chamber 18 has threads 50 which are engageable with the threads 52 on the open bottom end 30 of the top chamber 26.

Figure 1:
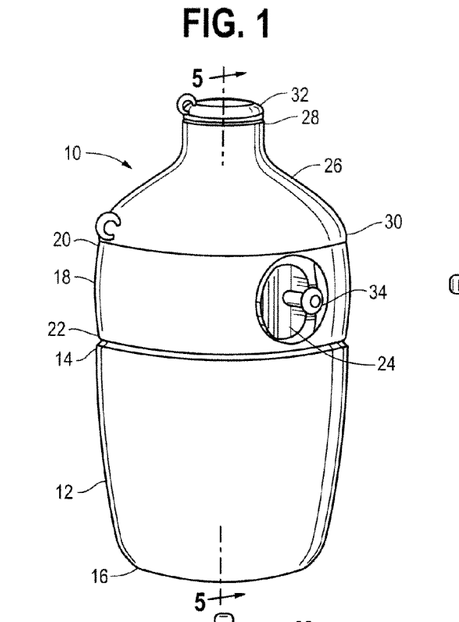
FIG. 1 is a perspective front elevation view of an embodiment of the powder dispenser of the present invention.
Figure 2:
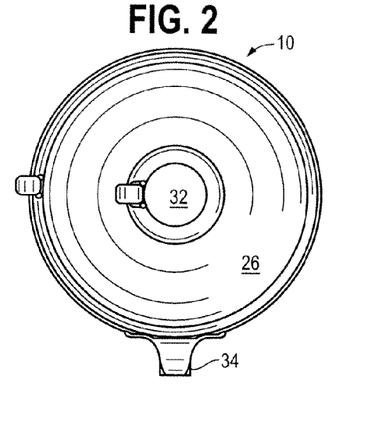
FIG. 2 is a top plan view of the embodiment of the powder dispenser of FIG. 1.
Figure 3:
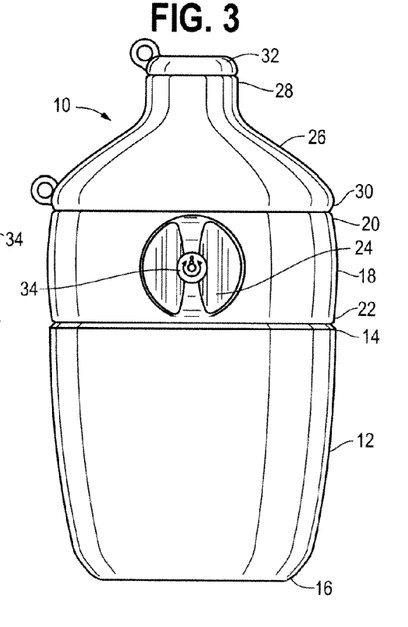
FIG. 3 is a front view of the embodiment of the powder dispenser of FIG. 1.
Figure 4:
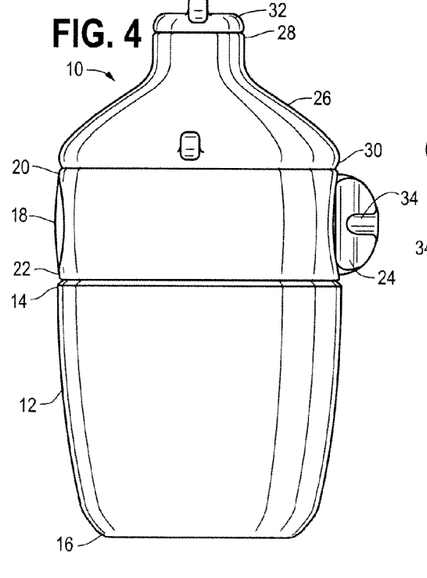
FIG. 4 is a side view of the embodiment of the powder dispenser of FIG. 1.
Figure 5:
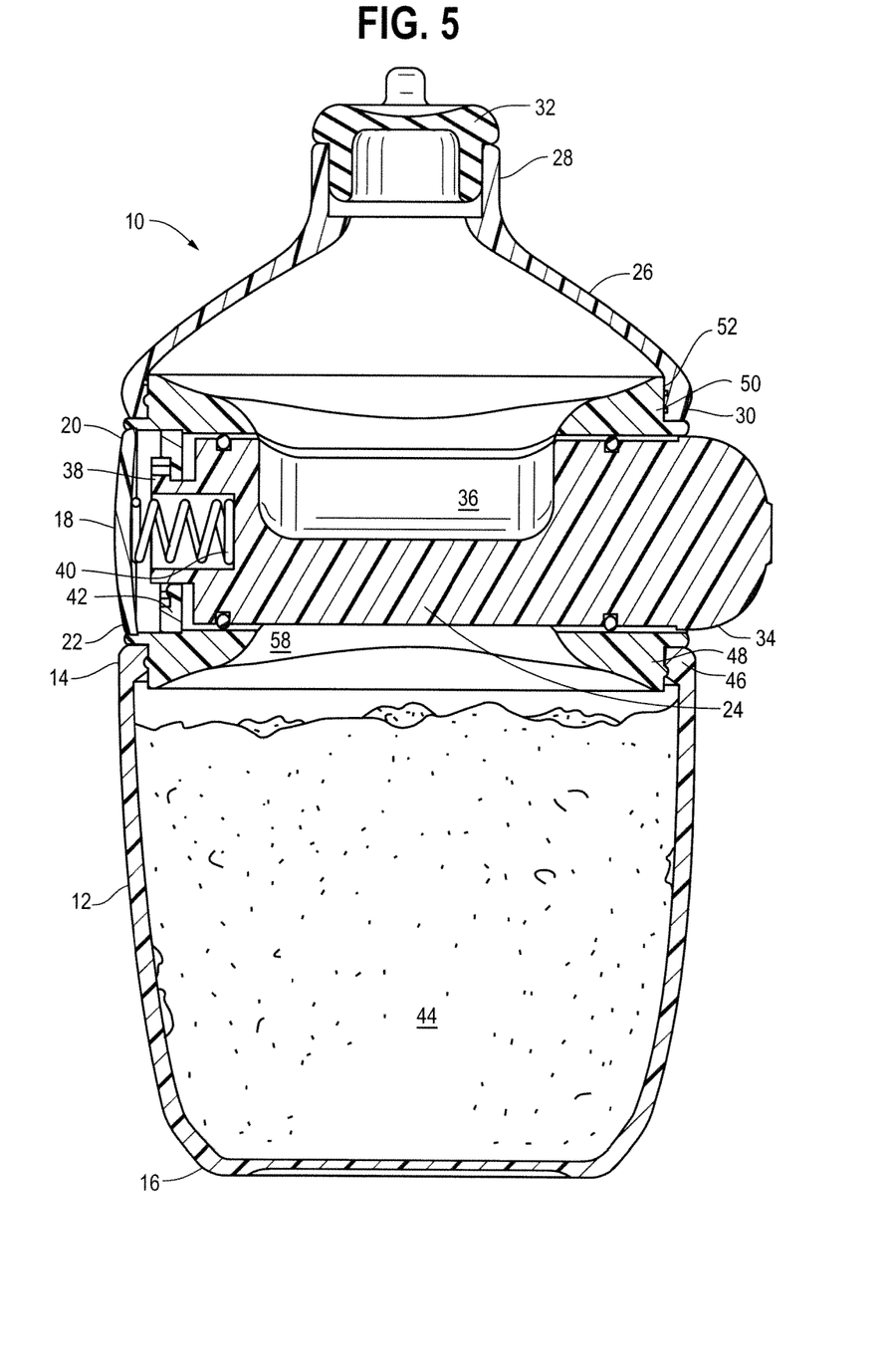
FIG. 5 is a section view of the embodiment of the powder dispenser of FIG. 1 taken along line 5-5 in FIG. 1, and showing a powdery substance in the bottom housing chamber of the dispenser.
Figures 6, 7, 8, 9, 10:
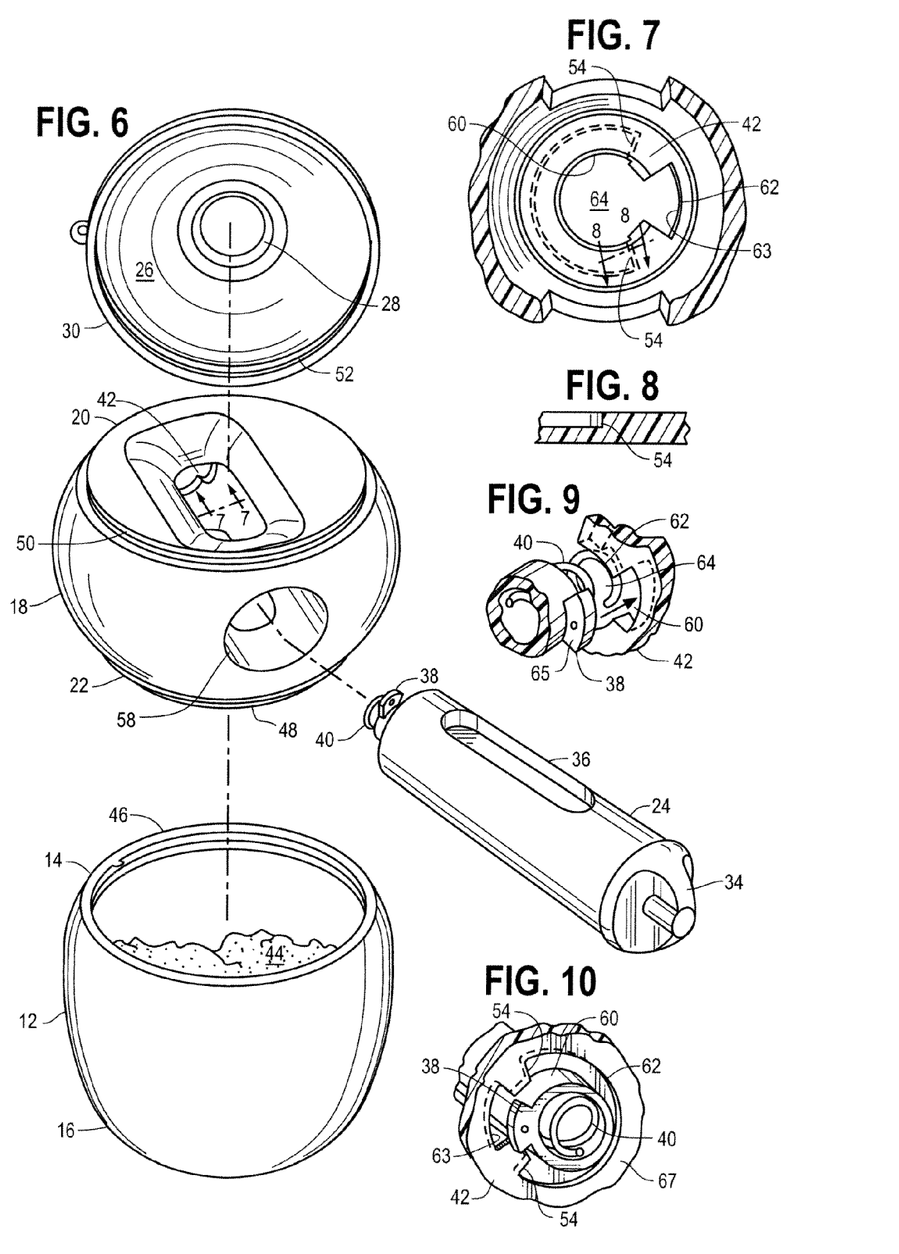
FIG. 6 is an exploded view of the three separate chambers and measuring device of the embodiment of the powder dispenser of FIG. 1.
FIG. 7 is a detail perspective view of the locking ring inside the middle chamber of the embodiment of the powder dispenser shown in FIG. 1.
FIG. 8 is a side detail view of the protuberance of the locking ring of FIG. 7.
FIG. 9 is a side perspective view showing the engagement of the locking tooth of the measuring device and the locking ring of the middle chamber.
FIG. 10 is a perspective exploded view showing the disengagement of the locking tooth of the measuring device and the locking ring of the middle chamber.
Figure 11:
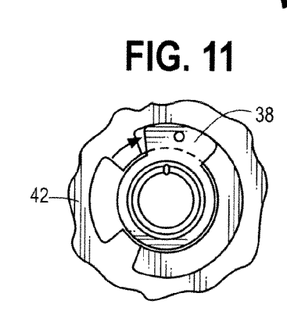
FIG. 11 is a detail view showing the rotation of the locking tooth of the measuring device inside the locking ring of the middle chamber.

Referring to the embodiment shown in FIGS. 5 and 6, measuring device 24 is cylindrical in shape and is slidably and removably engageable with the internal chamber 58 of the middle chamber 18. The measuring device 24 has an open cavity 36 on one side for receiving and measuring the powder substance 44 from the housing chamber 12 when dispensing apparatus 10 is inverted (FIG. 12A).

Referring to FIGS. 7-10, the measuring device 24 has a locking tooth 38 which is engageable with the locking ring 42 of the middle chamber 18. The locking ring 42 of the middle chamber 18 has a central open portion 60, an outer rim 62, a key slot 63 and a rear surface 64 of the middle chamber 18. The user, gripping the handle 34, slides the desired measuring device 24 into internal chamber 58 of the middle chamber 18, applies an axial force which compresses the spring mechanism 40 of the measuring device 24 against the rear surface 64 of middle chamber 18. The locking tooth 38 slides through the key slot 63 and engages with the rear surface 64 of the middle chamber 18. In this position, measuring device 24 is rotated slightly so that face 65 of locking tooth 38 engages wall 67 of locking ring 42; thus retaining measuring device 24 in internal chamber 58, in which the measuring device 24 is free to rotate. The measuring device 24 and the middle chamber 18 include seals disposed between them to maintain the powder substance 44 in and adjacent to the open cavity 36 when the measuring device 24 is rotated inside internal chamber 58. To remove measuring device 24 from internal chamber 58, the measuring device 24 is rotated until locking tooth 38 aligns with key slot 63, allowing an axial force applied to the measuring device to enable removal of the measuring device from internal chamber 58.

To begin use of dispenser 10, middle chamber 18 is rotated while holding housing chamber 12 stationary. Middle chamber 18 then becomes detached from housing chamber 12. Powdery substance 44 is then placed into housing chamber 12, and middle chamber 18 is then reattached to housing chamber 12 by means of threads 46, 48.

Figure 12A:
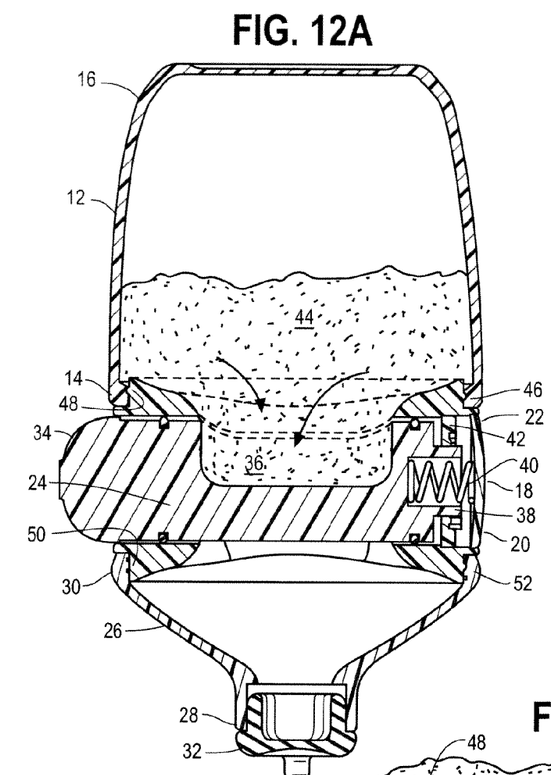
FIG. 12A is a side sectional view of the embodiment of the powder dispenser of FIG. 1 in an inverted position, showing the cavity of the measuring device receiving a measured amount of the powder substance from the bottom housing chamber.
Figure 12B:
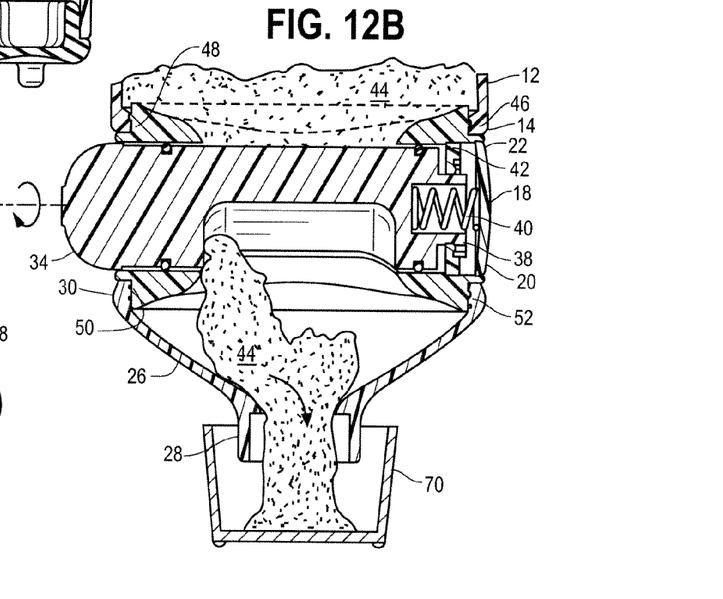
FIG. 12B is a partial sectional view showing the upper half of the embodiment of the powder dispenser of FIG. 1, showing the rotation of the measuring device and the powder dispensing from the cavity of the measuring device into the tapered top chamber, and out of the open top end of the tapered top chamber into a receptacle.

Referring to FIGS. 12A and 12B, when using the powder dispensing apparatus 10 of the present invention to dispense powder 55, the user grasps handle 34 of measuring device 24 in chamber 58 and rotates the measuring device 24 from a first position to a second position where the first protuberance 54 attached to middle chamber 18 engages the locking tooth 38 attached to measuring device 24 and halts rotation. The open cavity 36 faces the housing chamber 12 once the first protuberance 54 and locking tooth 38 have engaged. The user removes cap 32 from top end 28 of the tapered top chamber 28, turns the powder dispensing apparatus 10 upside down, engages the open top end 28 with a liquid receptacle 70, such as a standard size baby bottle or standard size water bottle, and the powder substance 44 flows from the housing chamber 12 into the open cavity 36 of the measuring device 24. The open top end 28 may fit inside the standard size baby bottle or over a standard size water bottle. The user grasps handle 34 of measuring device 24 once again and rotates the measuring device 24 back to the first position, where the open cavity 36 of measuring device 24 faces the tapered top chamber and dispenses the powder substance 44 into the tapered top chamber 26. The powder substance 44 flows from the tapered top chamber 26 into the liquid receptacle 70, where the powder is mixed with the liquid in the liquid receptacle. In an alternate embodiment, the open top end 28 may be tapered, if desired, to fit into odd size bottle openings.

As discussed above, and as shown in FIG. 6, the housing chamber 12, middle chamber 18, measuring device 24, and top chamber 26 are all readily detachable from each other for ease of cleaning. For example, after the dispenser 10 has been used as described above, the top chamber 26 is rotated and detached from middle chamber 18 by disengaging threads 50 from threads 52. In the same manner, middle chamber 18 is rotated relative to housing chamber 12 until threads 46, 48 disengage, and the middle chamber and housing chamber are separated.

Measuring device 24 is rotated in internal chamber 58 of middle chamber 18 until locking tooth 38 aligns with key slot 63 of locking ring 42. An axial force is then applied to measuring device 24, and the measuring device 24 and spring 40 are withdrawn from internal chamber 58. Spring 40 is then removed from measuring device 24. It is contemplated that all of the elements of dispenser 10, with the possible exception of spring 40, are made of a dishwasher-proof material. Once the elements of dispenser 10 are separated, they may be cleaned in a dishwasher or by hand, or other suitable ways as are known in the art.

Figure 13:
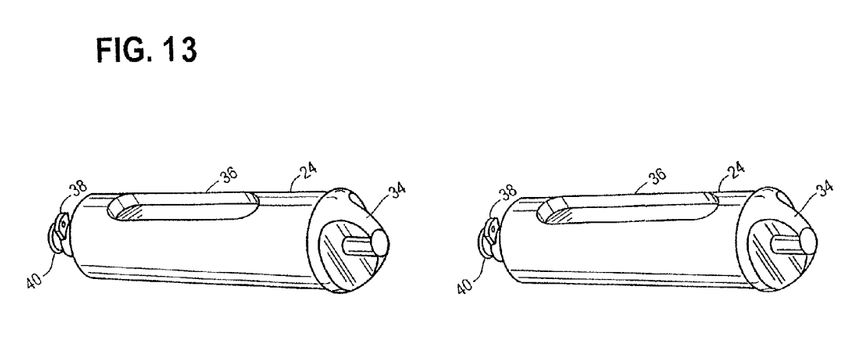
FIG. 13 is a view showing, as a non-limiting example, two measuring devices having different volume open cavities.

One practical use of the powder dispensing apparatus 10 described above is when a user is on the go. Users can now measure a predetermined amount of powder substance 44 and mix to make food or drink while at the gym, in the park, in the car, or anywhere away from home. As illustrated by the two removable measuring devices 24 shown in FIG. 13, the removable measuring devices 24 come with a variety of different volume open cavities 36, allowing the user to choose how much powder substance 44 is required.

The foregoing description of an illustrated embodiment of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A dispensing apparatus comprising:
   a housing chamber arranged to receive and store a substance, the housing chamber including an open top end and a closed bottom end;
   a middle chamber removably fastened to the housing chamber, the middle chamber including an open top end and an open bottom end;
   a measuring device including an open cavity arranged to receive and measure a predetermined amount of the substance from the housing chamber; and
   a top chamber removably fastened to the middle chamber, the top chamber including an open top end and an open bottom end, the top chamber arranged to receive the predetermined amount of the substance from the open cavity; wherein
   the measuring device is removably and slidably engageable with the middle chamber, and the measuring device includes a locking tooth rotatable from a first position which locks the measuring device in the middle chamber to a second position which unlocks the measuring device from the middle chamber to allow removal of the measuring device from the middle chamber.

2. The dispensing apparatus of claim 1, wherein the measuring device is rotatable from the first position where the open cavity opens towards the housing chamber to the second position where the open cavity opens towards the top chamber, and the open cavity is arranged to transfer the predetermined amount of the substance from the housing chamber into the top chamber.

3. The dispensing apparatus of claim 1, wherein the middle chamber includes a locking ring, and the locking tooth of the measuring device is arranged to releasably engage the locking ring.

4. The dispensing apparatus of claim 1, wherein the middle chamber includes a locking ring including a central open portion and a key slot extending radially outward from the central open portion, and the key slot is arranged to receive the locking tooth when the locking tooth is in the second position.

5. The dispensing apparatus of claim 4, wherein the locking ring includes an outer rim and a rear surface, the key slot is located adjacent to the outer rim of the locking ring, and the locking tooth engages the rear surface of the locking ring when the locking tooth is in the first position.

6. The dispensing apparatus of claim 5, further including a spring extending between a wall of the middle chamber and the measuring device, wherein the spring biases the locking tooth against the rear surface of the locking ring when the locking tooth is in the first position.

7. The dispensing apparatus of claim 1, wherein the measuring device includes a spring arranged to allow the locking tooth to retain the measuring device in the middle chamber and to allow removal of the measuring device from the middle chamber.

8. The dispensing apparatus of claim 1, wherein the measuring device includes a handle arranged to rotate the measuring device.

9. The dispensing apparatus of claim 1, wherein the middle chamber includes an internal chamber, and the measuring device is removably and rotatably located in the internal chamber.

10. The dispensing apparatus of claim 1, wherein the open top end of the top chamber is tapered and arranged to engage with a receptacle to dispense the predetermined amount of the substance into the receptacle.

11. The dispensing apparatus of claim 1, wherein the top chamber includes a removable lid, and the removable lid is engageable with the open top end of the top chamber.

12. The dispensing apparatus of claim 1, wherein the open top end of the housing chamber is threaded, the open bottom end of the middle chamber is threaded, and the open bottom end of the middle chamber is removably engageable with the open top end of the housing chamber.

13. The dispensing apparatus of claim 1, wherein the open top end of the middle chamber is threaded, the open bottom end of the top chamber is threaded, and the open bottom end of the top chamber is removably engageable with the open top end of the middle chamber.

14. The powder dispensing apparatus of claim 1, further comprising a plurality of the measuring devices, wherein the open cavity in each of the plurality of measuring devices has a volume that is different from a volume of the open cavity in others of the plurality of measuring devices.

15. The dispensing apparatus of claim 1, further comprising:
   a first protuberance attached to the middle chamber; wherein
   rotation of the measuring device in the middle chamber stops when the locking tooth engages the first protuberance.

16. The dispensing apparatus of claim 1, wherein the measuring device is cylindrical in shape.

17. The dispensing apparatus of claim 1, wherein the substance is a powder, and the open cavity is arranged to receive and measure the predetermined amount of the powder from the housing chamber into the top chamber.

18. A dispensing apparatus comprising:
a housing chamber arranged to receive and store a substance, the housing chamber including an open top end and a closed bottom end;
a middle chamber removably fastened to the housing chamber, the middle chamber including an open top end and an open bottom end;
a measuring device including an open cavity arranged to receive and measure a predetermined amount of the substance from the housing chamber; and
a top chamber removably fastened to the middle chamber, the top chamber including an open top end and an open bottom end, the top chamber arranged to receive the predetermined amount of the substance from the open cavity; wherein
the measuring device is removably and slidably engageable with the middle chamber, and the measuring device includes a spring mechanism that applies a force used to lock and unlock the measuring device from the middle chamber.

* * * * *